Figure 1:
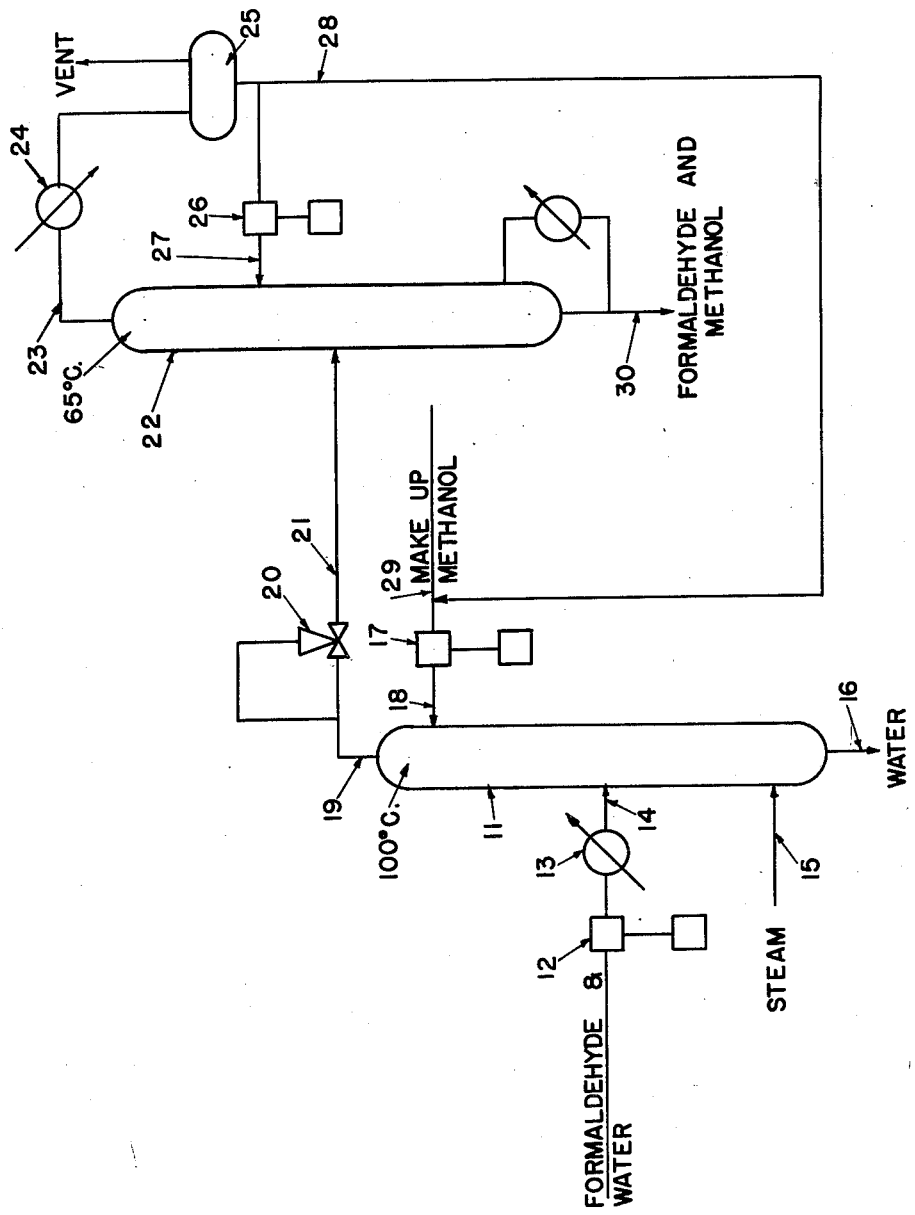

Aug. 28, 1951

J. F. McCANTS 2,565,569

FORMALDEHYDE PURIFICATION

Filed Nov. 5, 1948

2 Sheets-Sheet 1

JAMES F. McCANTS
*INVENTOR.*

BY Buell B. Hamilton
PATENT AGENT

Aug. 28, 1951     J. F. McCANTS     2,565,569
FORMALDEHYDE PURIFICATION

Filed Nov. 5, 1948     2 Sheets-Sheet 2

JAMES F. McCANTS
*INVENTOR.*

BY Buell B. Hamilton
PATENT AGENT

Patented Aug. 28, 1951

2,565,569

UNITED STATES PATENT OFFICE 2,565,569

FORMALDEHYDE PURIFICATION

James F. McCants, Tulsa, Okla.

Application November 5, 1948, Serial No. 58,594

10 Claims. (Cl. 202—40)

This invention relates to the purification of formaldehyde, and more particularly to the separation of formaldehyde from mixtures thereof with water.

My invention broadly comprises the fractional distillation of an aqueous solution of formaldehyde at elevated temperature and pressure in the presence of methanol, whereby a formaldehyde distillate fraction may be withdrawn in substantially anhydrous condition, or with a substantially diminished proportion of water.

In most commercial processes for the manufacture of formaldehyde, a large quantity of water is simultaneously produced, together with smaller quantities of various organic impurities, such as aldehydes, acids, acetals, alcohols, ketones, and the like. The isolation of formaldehyde from the crude reaction product is an important and difficult undertaking, particularly when the formaldehyde is produced by certain processes, such as the oxidation of gaseous petroleum fractions, in which the crude formaldehyde is obtained in relatively dilute aqueous solution together with a relatively high proportion of organic impurities. Various methods have been disclosed in the prior art for effecting the desired separation and purification. For example, by distilling a solution of formaldehyde and subjecting the vaporous distillate to partial condensation, an overhead product enriched in formaldehyde content may be obtained. In actual practice, however, it has never been possible to achieve more than a partial concentration and purification of formaldehyde in this way, and serious trouble is generally encountered from the formation of solid formaldehyde polymers in excessive amounts on the cool surface of the partial condenser. Another method involves the use of vacuum distillation to remove water and low-boiling organic impurities overhead, leaving a formaldehyde concentrate in the distillation bottoms. This method is also incapable of producing anhydrous formaldehyde, and it is incapable of removing such impurities as acetic and formic acids and dissolved inorganic compounds. In another process, an azeotroping agent, such as ethyl acetate, is used to distill water out of the aqueous formaldehyde solution. This method is capable of giving a more nearly anhydrous formaldehyde product; but like vacuum distillation, it is incapable of separating non-volatile impurities. Pressure distillation is a highly advantageous method, in that the formaldehyde is collected as an overhead product; thus, relatively dilute solutions may be processed economically because of the low heat requirements of the process. Unfortunately, however, adequate fractionation is not feasible, owing to the fact that a liquid formaldehyde reflux cannot be provided. Moreover, the utility of the process is limited by the fact that the excessively high temperatures required for efficient pressure distillation tend to destroy much of the formaldehyde through a Cannizzaro-type reaction.

An object of my invention is to provide a superior means for purifying and concentrating aqueous formaldehyde solutions. Another object of my invention is to provide a method for selectively removing formaldehyde from mixtures thereof with water. A further object of my invention is to provide a means for preparing formaldehyde in substantially anhydrous condition. A still further object of my invention is to prepare a solid polymeric form of formaldehyde having desirable mechanical properties and high water solubility. Other objects of my invention and its advantages over the prior art will be apparent from the following description and examples.

Figure 2:
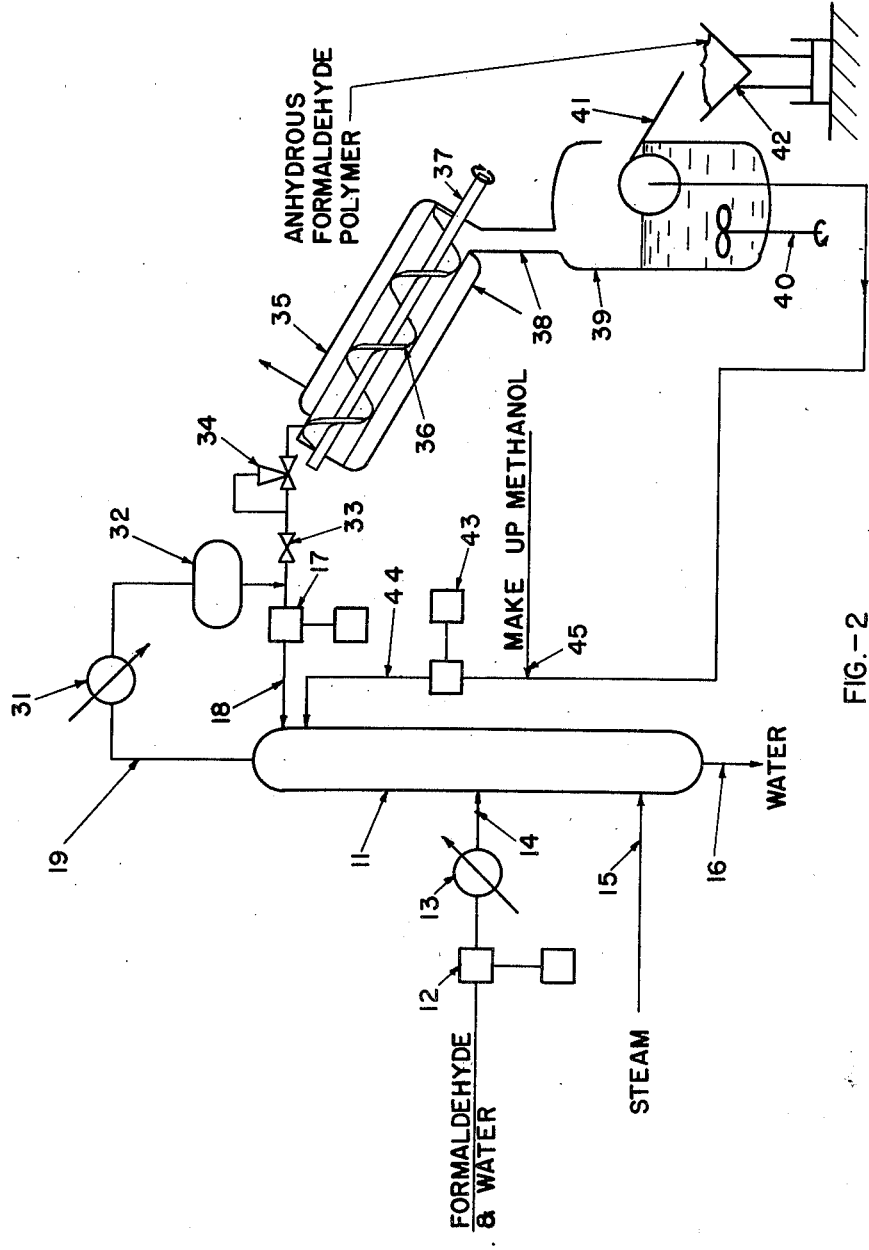

Figures 1 and 2 represent flow charts illustrating two embodiments of my invention. The same reference numbers in both figures refer to the same or corresponding parts. In general in my process an aqueous solution of formaldehyde is fractionally distilled under a reflux of methanol at a pressure sufficient to cause the top temperature of the fractionating column to remain above about 80° C. or more. The upper temperature limit is governed only by the formaldehyde decomposition which takes place at the more elevated temperatures.

In the past, methanol-contaminated aqueous formaldehyde solutions have been distilled at atmospheric pressure under substantially total reflux. The result is that methanol, substantially free from water and formaldehyde collects in the top of the column at its boiling point of about 65° C. and can be drawn off, thus removing the methanol from the aqueous formaldehyde solution. It will be noted that under these conditions no separation of formaldehyde and water is achieved, both the formaldehyde and water passing together out the bottom of the fractionating column.

In the past, mixtures of methanol, formaldehyde and water have also been flash distilled both at atmospheric pressure and at superatmospheric pressure, the temperature of the vapors leaving the still being of the order of 100° C. since no reflux or fractionation was employed. Under these conditions an overhead product was obtained containing methanol, water, and an increased concentration of formaldehyde. The increase in formaldehyde concentration was about the same whether methanol was present or not. The bottoms product from the distillation consisted of a solution of formaldehyde more dilute than the feed, but still containing considerable quantities of formaldehyde.

My process differs from the first of these prior art processes in that in my process the top temperature of the fractionating column is maintained at a temperature above about 80° C., whereas in the first of the prior art processes discussed this temperature was maintained at about 65° C. In the prior art process virtually no separation of formaldehyde and water took place, substantially all the formaldehyde passing out the bottom of the fractionating column with the water, while in my improved process any desired degree of separation of formaldehyde from water can be achieved, virtually all the formaldehyde being recovered as an overhead product, and substantially none of the formaldehyde passing out the bottom of the column with the water.

My process differs from the second of the prior art processes discussed in that in my process the aqueous formaldehyde solution is rectified as distinguished from the flash distillation of the prior art process. This causes a major difference in results, in that in the former process a large, uncontrollable amount of water comes overhead while a fairly large, uncontrollable amount of formaldehyde passes out the bottom of the still with the remainder of the water. In the typical prior art flash pressure distillation of aqueous formaldehyde solutions more than 50% of the water in the feed is taken overhead with formaldehyde vapor, and as much as 30% of the formaldehyde is lost to the bottoms product. In my process, on the other hand, only a small controlled amount of water or no water at all is taken overhead, and virtually none of the formaldehyde is lost in the water passing out the bottom of the column.

The reasons for these marked distinctions from prior art processes I believe to be as follows, although it will be understood that my invention is not limited by this theory. In the prior art distillation of methanol from aqueous formaldehyde solution at atmospheric pressure, the top temperature of the fractionating column was the boiling point of methanol, or about 65° C. At this temperature monomeric formaldehyde is in equilibrium with polymeric formaldehyde, and with reaction products with both water and methanol, the equilibrium favoring the polymeric form and reaction products with water and methanol. As a result, the vapor pressure of formaldehyde in equilibrium with the liquid in the distilling column was very low. Consequently, formaldehyde vapors could not rise past the downwardly flowing water and methanol in the column. The formaldehyde was washed down the column leaving a substantially pure methanol at the top of the column.

In the prior art pressure distillation of methanol from aqueous formaldehyde solutions little or no reflux and fractionation were employed. As a result, the vapors coming overhead consisted principally of water, although the usual concentrating effect observed in any pressure distillation of aqueous formaldehyde solutions occurred.

In my process, the pressure is regulated to provide a top fractionating column temperature above about 80° C. At temperatures above about 80° C., the equilibrium between monomeric and polymeric formaldehyde favors the monomeric form. Also the reaction products of formaldehyde with water and methanol begin to break down at about this temperature. In addition, the higher temperature causes rapid decomposition of the formaldehyde addition products so that upon removal of some of the monomeric formaldehyde as vapor, more of the monomeric form is rapidly produced. Since a large amount of monomeric formaldehyde is present, the partial pressure of formaldehyde in equilibrium with both water and methanol is high. Therefore, the formaldehyde vapors are not washed down the column by downwardly flowing water and methanol, but pass out the top of the column. Regarding the methanol and water, no azeotrope forms, so it is relatively simple to reflux the water down the column with a methanol reflux. As a result, a substantially water-free product can be withdrawn overhead consisting almost wholly of methanol and formaldehyde.

Methanol is unique in its ability to reflux water down a column while permitting formaldehyde to pass out of the column under the conditions set forth. Methanol forms no azeotrope with water, and due to its complete miscibility with water no heteroazeotrope is formed. While methanol reacts with formaldehyde, the reaction product is unstable under the conditions of the distillation, permitting the formaldehyde to pass out the top of the column.

In carrying out my process batchwise, a conventional pressure still may be used, comprising a kettle equipped with indirect heating means, a packed or bubble-cap fractionating column, a condenser, a reflux drum, and a pressure-reduction valve or valves for withdrawal of a portion of the overhead stream, either before or after condensation. Suitable vapor and liquid lines are provided for regulating the pressure within the still, for example by regulating the heat input to the still kettle. The charging stock, comprising water and formaldehyde, and in some cases a quantity of methanol, are introduced into the still kettle. Heat is then applied to the contents of the kettle, and the still is brought to reflux until equilibrium has been established. Withdrawal of the overhead product is then started at a rate sufficiently low to maintain the withdrawn material in anhydrous form, or with not more than the desired maximum proportion of water. As the distillation proceeds, additional quantities of methanol may be introduced into the system, directly into the still kettle, if desired, or preferably into the top or an intermediate point of the fractionating column. The proportion of methanol within the system should be maintained at such a level at all times that the temperature of the vapor stream at the top of the fractionating column is not substantially greater than the boiling point of methanol under the pressure conditions employed in the process. The distillation is continued until substantially all of the formaldehyde has been volatilized from the still kettle and taken off overhead. Thereafter, any quantity of methanol remaining in the system is fractionally distilled and withdrawn, and the distillation is discontinued.

Preferably my process is carried out continuously. In the continuous process a mixture of water and formaldehyde in the liquid or vapor state is introduced into a fractionating column at a point intermediate the top and bottom. The liquid flows down the column and formaldehyde is stripped from the water by a reboiler at the base, or by open steam. An advantage of my process lies in the possibility of using open steam and thus avoiding the use of a reboiler. In most other formaldehyde-concentrating processes at least a portion of the formaldehyde is withdrawn with water as a bottoms product. Open steam usually is not employed in order to avoid diluting this stream. In my process, however, the bottoms product is stripped substantially free from formaldehyde, so the additional water formed by condensation of open steam is not objectionable.

The vapors pass up the column and meet, above the feed plate, a downwardly flowing reflux of methanol provided by introducing a liquid methanol reflux into the top of the column or by otherwise cooling the top of the column. Water vapor is gradually replaced by methanol vapor, and the methanol and formaldehyde vapors pass upwardly through the column, becoming more anhydrous as they rise, by further replacement of water by methanol. From the top of the column a substantially water-free stream of methanol containing a high concentration of formaldehyde is withdrawn in liquid or vapor form.

This stream may be handled in several ways. If the feed to the distilling column is a fairly dilute formaldehyde solution, the overhead stream may contain only about 20 percent formaldehyde, the remainder of the stream being methanol. In this case it is usually desirable to return a part of this stream as reflux rather than employing fresh methanol. The effect of returning the formaldehyde solution as reflux is to build up the formaldehyde content of the overhead stream to the desired value. Another means of accomplishing the same purpose is illustrated in Figure 1 of the drawing.

Referring to Figure 1, a fractional distillation is carried out according to my invention in column 11. An aqueous solution of formaldehyde is fed to this column by pump 12 through heater 13 and line 14. The bottom of this column is heated by open steam introduced through line 15 to strip methanol and formaldehyde from the water. Substantially formaldehyde-free water flows from the bottom of column 11 through line 16 to waste. The formaldehyde and water vapors rise through the column, the water being refluxed back by methanol introduced by pump 17 through line 18, while the formaldehyde continues out the top of the column which is maintained at a temperature above about 80° C., preferably about 100° C. as indicated. Methanol and formaldehyde are removed from the top of column 11 through line 19 and pass through a pressure reducing valve 20 which reduces the pressure to approximately atmospheric pressure. This stream may be condensed and refluxed if desired, as indicated above, to build up formaldehyde concentration. In the process illustrated in Figure 1, however, this stream flows through line 21 into fractionating column 22 operated with a top temperature below about 80° C., preferably about 65° C., as indicated. Under these conditions as pointed out before, substantially formaldehyde-free methanol is withdrawn overhead through line 23, condensed in cooler 24 and flows to reflux drum 25. Part of this methanol is returned by pump 26 through line 27 to column 22 as reflux. The remainder is returned through line 28 to the intake of pump 17 as reflux for column 11. Make up methanol is introduced through line 29. From the bottom of column 22 a methanol solution of the desired formaldehyde concentration is withdrawn through line 30 to storage or further processing.

Referring now to Figure 2, the process illustrated is the same as that of Figure 1 except as follows. The methanol and formaldehyde mixture in line 19 is condensed in cooler 31 and flows to reflux drum 32 from which a portion is returned by pump 17 through line 18 to column 11 as reflux to build up the concentration of formaldehyde in the overhead. A portion of the stream from reflux drum 32 is withdrawn through control valve 33 and pressure reducing valve 34 to cooler 35 which is maintained at a temperature sufficiently low to cause precipitation of formaldehyde polymer. This polymer is scraped from the walls of cooler 35 by spiral scraper 36 rotated by means of shaft 37, and falls through pipe 38 into filter 39 stirred by mixer 40. The formaldehyde polymer is scraped off the drum of filter 39 by blade 41 and is carried away as by cart 42 to storage or further processing such as passage to a drying oven where excess methanol is evaporated. Methanol from filter 39 is recycled by means of pump 43 through line 44 to column 11 as part of the reflux for this column. Make-up methanol is introduced through line 45 into the intake to pump 43.

It will be noted that the reflux system for column 11 in Figure 2 is a high-pressure system. The reason for this is to permit maintaining an elevated temperature in this system so as to insure a high solubility of formaldehyde polymer in the methanol and thus make certain that no precipitate forms in the reflux system.

It will be apparent that the methanol solution of formaldehyde in line 30 of Figure 1 can be adjusted to a composition suitable for sending to cooler 35 in Figure 2 for polymer formation. This polymer, from either source, is found to consist principally of formaldehyde.

However, it is found that the polymer contains considerable methanol which cannot be removed by drying operations. This methanol is chemically combined with the formaldehyde polymer. It serves a very useful purpose in preventing excessive polymerization of the formaldehyde. This solid, anhydrous, methanol-containing polymer is a unique product of considerable value in many applications. Due to the polymerization inhibiting effect of the methanol, the solid remains highly water-soluble. The polymer is particularly applicable to plastics manufacture in which a low-molecular-weight formaldehyde polymer is desirable in an anhydrous condition. Many other applications and uses of this low-molecular-weight, anhydrous formaldehyde polymer will occur to those skilled in the arts in which formaldehyde is employed.

If a concentrated water solution of formaldehyde is desired, my process can be operated with a reduced methanol reflux to permit the desired quantity of water to come overhead. Excess methanol, if any, can then be removed from the overhead stream in a second distillation at atmospheric pressure as illustrated in Figure 1 or under a vacuum, to provide a top temperature less than about 80° C., producing as a bottoms product from this second distillation the desired concentrated aqueous solution of formaldehyde, inhibited by the proper concentration of methanol.

My process can be combined advantageously with most prior art formaldehyde-concentrating processes. Most of these processes produce a marketable solution of formaldehyde of medium concentration, but in producing this solution a second solution of formaldehyde is produced which is less concentrated than the feed, and which contains an appreciable quantity of the formaldehyde fed to the process. This dilute solution generally cannot be concentrated economically to a marketable product by prior-art processes.

Since my process operates as well with dilute feeds as with concentrated feeds, the dilute solution of formaldehyde from the prior art process can be concentrated in a high-temperature methanol-refluxed column according to my invention to produce a solution of formaldehyde in methanol having almost any desired ratio of formaldehyhe to methanol. This methanol solution is then blended with the concentrated solution from the prior art process.

The concentration of formaldehyde in the final blended product can be controlled by operating the prior art process to produce a concentrated formaldehyde solution containing only the amount of water desired in the final product. My process can then be employed to recover the formaldehyde remaining in the dilute solution; this formaldehyde being recovered as an anhydrous methanol solution or as an anhydrous solid polymer of the proper formaldehyde to methanol ratio to bring the concentration of the blend up to the 37 to 40 percent formalin of commerce, or any other desired value, and at the same time provide the desired quantity of methanol to inhibit polymerization and precipitation of formaldehyde polymer.

In the combination process, the prior art process greatly reduces the load on the methanol-refluxed column, while the methanol-refluxed column recovers the formaldehyde usually lost in the dilute solution from the prior art process, permitting the prior art process to be operated under optimum conditions for heat conservation and for avoiding formaldehyde decomposition.

My invention will be more fully understood from the following specific examples.

*Example I*

In the following experiment, 200 grams of methanol and 200 grams of an aqueous 5% solution of formaldehyde were introduced into a one-liter distillation vessel, equipped with an internal electric heating element, regulated by means of an adjustable autotransformer. The mixture was distilled through an uninsulated fractionating column having an internal diameter of one inch and a height of approximately four feet. The column was packed with ¼-inch Berl saddles, and reflux was provided by the naturally occurring condensation within the column, resulting from the fact that the column was not provided with thermal insulation. The pressure at the top of the column was maintained at 35 pounds per square inch, gage. A liquid overhead product fraction weighing 50 grams was withdrawn. This fraction was substantially water-free, and contained 18.1 percent by weight of formaldehyde, corresponding to 90.5 percent of the formaldehyde in the charging stock.

*Example II*

An aqueous 37 percent formalin solution was fractionally distilled in the presence of methanol under conditions duplicating those of Example I. A liquid overhead product fraction weighing 100 grams and containing 58.8 percent by weight of formaldehyde was withdrawn. On being cooled to 0° C., the product fraction deposited polymeric formaldehyde, which was separated by filtration and dried under vacuum at room temperature. The resulting polymer weighed 11.2 grams, contained 86.4 percent formaldehyde and was substantially water-free.

While the foregoing examples illustrate advantageous embodiments of my invention, it will be understood that I am not limited to the specific charging stocks, apparatus, manipulative steps, procedures, or operating conditions described therein. In general, it may be said that my invention is to be construed broadly within the terms of the description and the appended claims, and my invention is to be understood as including any modifications or equivalents that would ordinarily occur to those skilled in the art.

My invention represents a substantial advance in the art, by means of which it is now possible to obtain substantially purified formaldehyde as an overhead product of distillation, free from nonvolatile impurities, and by means of which formaldehyde may be converted rapidly, conveniently, and economically into a solid polymer having desirable mechanical properties and high water solubility. In addition, my invention offers the further outstanding advantage that a proportion of the total formaldehyde contained in a relatively dilute aqueous formaldehyde solution may be separated, purified, and converted directly to solid formaldehyde polymers of high quality without a preliminary concentration of the feed charge. Thus, it will be apparent that my invention represents a substantial advance, both technically and economically, over the processes of the prior art.

In accordance with the foregoing description, I claim as my invention:

1. In a process for separating formaldehyde from water, the steps which comprise fractionally distilling a mixture of formaldehyde and water in the presence of a methanol reflux at an elevated pressure and at a temperature above about 80° C., and separating therefrom a formaldehyde fraction containing a diminished proportion of water.

2. A method for concentrating aqueous solutions of formaldehyde comprising passing vapors of said formaldehyde and water upwardly through a fractionating column, providing a reflux of methanol in said column while maintaining the top temperature of said column above about 80° C., and withdrawing from the top of said column a product comprising methanol and formaldehyde having a substantially increased ratio of formaldehyde to water.

3. In the process of claim 2, fractionally distilling the product from the top of said column in a second column while maintaining the top of said second column at a temperature below about 80° C., and withdrawing from the bottom of said second column a solution of formaldehyde in water, containing a reduced concentration of methanol.

4. In the process of claim 2, cooling the product from the top of said column and returning a portion of said product to the top of said column as reflux, whereby an overhead product of increased formaldehyde concentration is obtained.

5. A method for separating formaldehyde from water comprising passing vapors of said formaldehyde and water upwardly through a fractionating column, refluxing the top of said column with methanol while maintaining the top temperature of said column above about 80° C.

and at a pressure sufficient to cause condensation of said methanol in the top of said column, and withdrawing overhead a substantially water-free stream of formaldehyde and methanol.

6. In the process of claim 5, fractionally distilling the overhead product in a second column while maintaining the top of said second column at a temperature below about 80° C., withdrawing overhead a stream comprising principally methanol, and withdrawing a bottoms product with a substantially decreased concentration of methanol.

7. In the process of claim 5, cooling the overhead product and returning a portion of said product to the top of said column as reflux, whereby an overhead product of increased formaldehyde concentration is obtained.

8. A method for forming from an aqueous solution of formaldehyde a solid substantially water-free, methanol-containing polymer of formaldehyde comprising fractionally distilling said solution in the presence of a methanol reflux at an elevated pressure and at a temperature above about 80° C., withdrawing overhead a stream comprising substantially water-free methanol and formaldehyde, cooling said stream to a temperature sufficient to cause precipitation of formaldehyde polymer from the solution, and separating said polymer from said solution.

9. A process for concentrating formaldehyde solutions comprising distilling a dilute aqueous formaldehyde solution to form a first stream richer in formaldehyde than the feed and a second stream poorer in formaldehyde than the feed, fractionally distilling said second stream in the presence of a methanol reflux at an elevated temperature above about 80° C., withdrawing overhead a third stream comprising substantially anhydrous methanol and formaldehyde, and mixing said third stream with said first stream to produce a concentrated aqueous formaldehyde solution containing methanol as a polymerization and precipitation inhibitor.

10. In a process for recovering formaldehyde in a substantially anhydrous condition from aqueous solutions thereof, the step which comprises contacting a vaporous mixture of formaldehyde and water with liquid methanol, condensing at least a portion of said water vapor while maintaining the temperature above about 80° C. and separating the condensed water from the remaining vapors.

JAMES F. McCANTS.

REFERENCES CITED

The following references are of record in the file of this patent:

UNITED STATES PATENTS

| Number | Name | Date |
|---|---|---|
| 1,666,708 | Kuss | Apr. 17, 1928 |
| 1,677,730 | Sator | July 17, 1928 |
| 1,905,033 | Bond | Apr. 25, 1933 |
| 1,948,069 | Fuchs et al. | Feb. 20, 1934 |
| 2,257,780 | Bludworth | Oct. 7, 1941 |
| 2,452,414 | Wong | Oct. 26, 1948 |
| 2,454,447 | Harney et al. | Nov. 23, 1948 |
| 2,465,489 | Sokol et al. | Mar. 29, 1949 |
| 2,475,959 | Hasche et al. | July 12, 1949 |

OTHER REFERENCES

Young: "Distillation Principles and Processes," copyrighted 1922 by MacMillan and Co., Limited, London, page 59.

Walker: "Formaldehyde," published 1944 by Reinhold Publishing Company, 330 West 42nd Street, New York, New York. Pages 62 and 63.